June 5, 1923.
C. H. HAPGOOD
1,457,571
FLUSH TANK VALVE MECHANISM
Filed Dec. 15, 1920
2 Sheets-Sheet 1
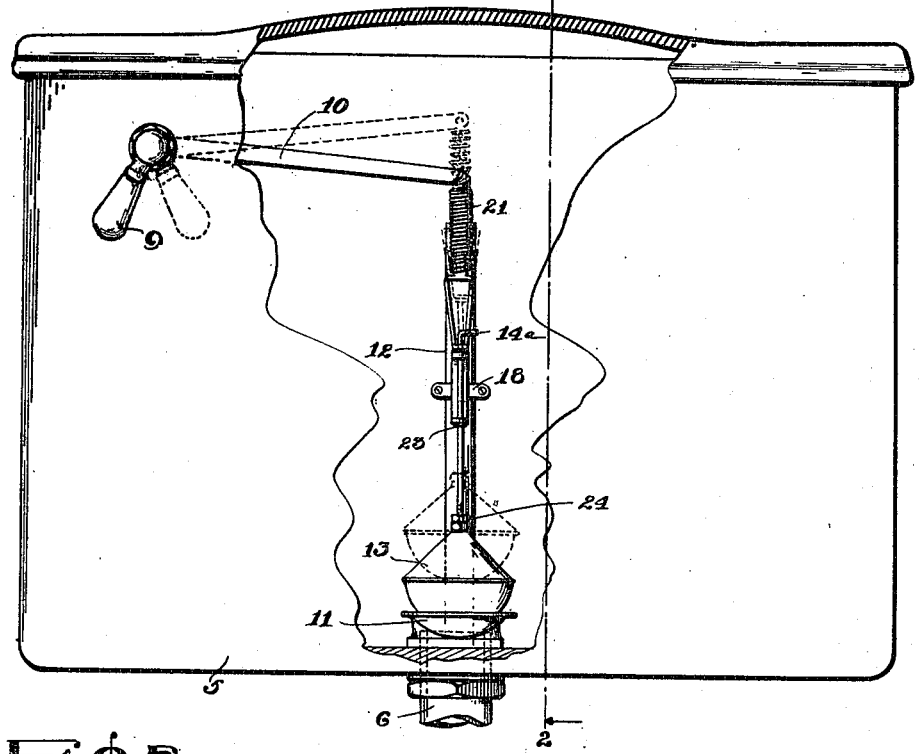
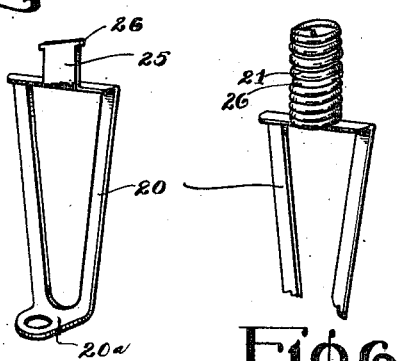
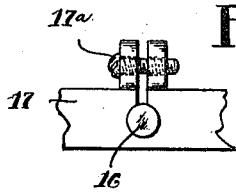
Witness
C. E. Wilcox.
Inventor
CLARENCE H HAPGOOD
By Rex Frye.
Attorney June 5, 1923.
C. H. HAPGOOD
1,457,571
FLUSH TANK VALVE MECHANISM
Filed Dec. 15, 1920
2 Sheets-Sheet 2
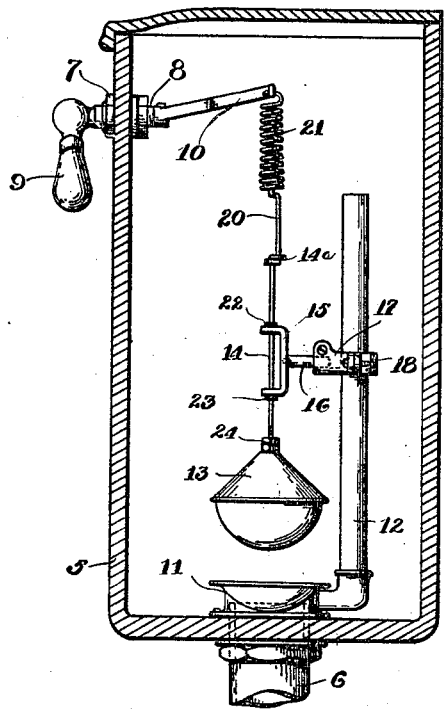
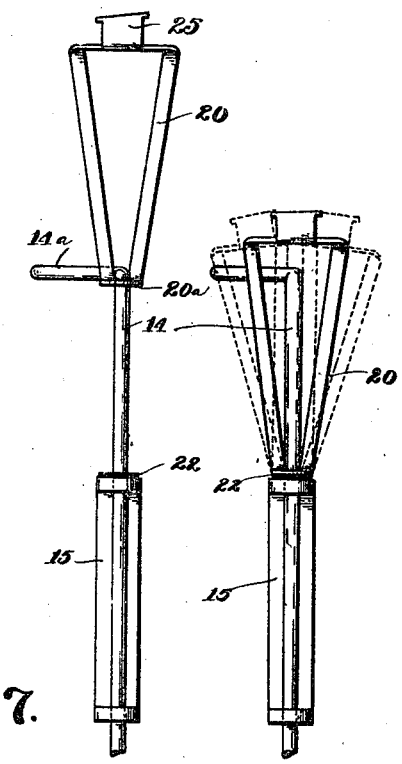
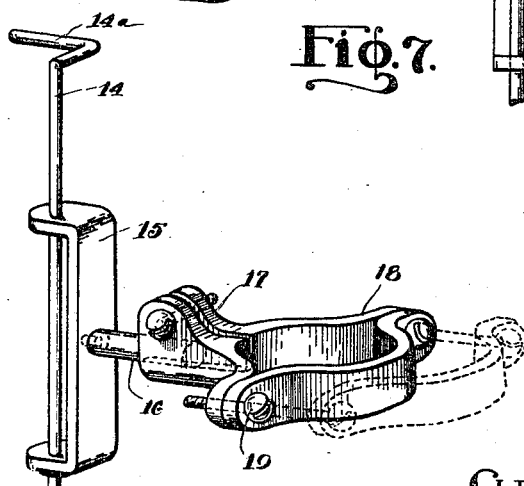
Witness.
C. E. Wilcox
By
Inventor
CLARENCE H HAPGOOD
Rex Frye.
Attorney Patented June 5, 1923.

1,457,571

UNITED STATES PATENT OFFICE.

CLARENCE H. HAPGOOD, OF TOLEDO, OHIO, ASSIGNOR OF ONE-HALF TO FOSTER V. WALTZ, OF ST. LOUIS, MISSOURI.

FLUSH-TANK-VALVE MECHANISM.

Application filed December 15, 1920. Serial No. 430,955.

*To all whom it may concern:*

Be it known that I, CLARENCE H. HAPGOOD, a citizen of the United States, residing at Toledo, in the county of Lucas and State of Ohio, have invented certain new and useful Improvements in Flush-Tank-Valve Mechanism, of which the following is a specification.

My invention relates to improvements in flush tank valve mechanism, and has for its primary object the provision of a valve operating mechanism that is certain in operation and which will insure the accurate re-seating of the valve upon discharge of the water from the tank and maintain it in seated position until again operated, whereby waste of water will be prevented.

Ancillary objects of my invention include the provision of improved adjustable connecting members whereby the alignment of the moving parts of the valve to secure the desired certainty of re-seating is rendered simple; the guidance of the valve stem in a bracket having widely separated bearings to maintain it always in vertical position; the provision of a shock absorbing member between the valve proper and its operating lever to equalize the pull on the valve and take up any excess movement of the lever; the arrangement of a slotted link between the valve stem and the shock absorbing member which will rock to take up any out-of-line movement of the lever and prevent the imparting of such movement to the valve stem; the positioning of a lock nut to prevent the tearing of the valve stem and connected bushing from the rubber portion of the ball valve; and the provision of noise-deadening members to avoid the objectionable noise usually present when the ordinary flush tank valves are operated.

With the above and other objects in view which will be readily apparent as the invention is better understood, my invention consists in the novel construction, combination and arrangement of parts to be hereinafter more fully described and particularly pointed out in the subjoined claims.

Reference is to be had to the accompanying drawings illustrating a preferred embodiment of my invention and wherein similar reference numerals designate similar parts throughout the several views.

In the drawings:—

Figure 1 illustrates a flush tank having shown in full lines my improved valve mechanism in position of rest and in dotted lines the position assumed while the water is flowing from the tank;

Figure 2 is a cross section thereof taken on the line 2—2 of Figure 1;

Figure 3 is a perspective view of the adjustable connecting members for positioning the valve;

Figure 4 is a detail view of the clamping means used to lock the valve mechanism in position after adjustment;

Figure 5 is a detail view of the slotted link;

Figure 6 is a similar view showing the lower end of the shock absorbing member fastened upon the link;

Figure 7 is a detail assembly showing the position of the link and stem when the valve is raised; and Figure 8 is a similar view showing in full lines the position the link assumes during the emptying of the tank and in dotted lines the extremes of positions it may assume to take up out-of-line movement.

Referring now to the drawings, the numeral 5 represents a flush tank of the customary type provided with an outlet pipe 6 arranged to empty into a closet bowl in the usual manner, and having in its front wall a bearing 7 for a stub shaft 8 adapted to support at its forward extremity a handle 9 and at its rear extremity an operating lever 10. The outlet pipe 6 connects with a circular valve seat 11 suitably supported upon the bottom of the tank 5, and an overflow pipe 12 leads into the lower portion of such seat. All of the foregoing members are customary in the flush tanks in ordinary operation, and my improved valve operating mechanism is specially designed for use with the flush tanks now in use.

The ball valve 13 is adapted to normally rest in the valve seat 11 and to fit so snugly therein that the escape of water is prevented. To insure this accurate positioning in the valve seat, the valve stem 14 must be in vertical alignment with the center of the circular seat 11 and be maintained in this vertical position despite the shocks it is called upon to bear whenever the valve mechanism is operated. The valve stem 14 passes through openings in the widespread arms of the bracket 15, which is formed with a rearwardly-projecting stem 16 adapted to be adjustably secured in the clamping section 17 of the securing member 18. This arrangement permits of forward and rearward adjustment of the bearings through which the valve stem passes by loosening the clamping screw 17$^a$ and moving the bracket stem 16 until the bearings are in exact alignment with the center of the seat 11. It would also be possible to rotate the bracket, if desired, to position the valve stem in other than a vertical position, as because of a short operating lever 10. The securing member 18 is preferably formed in two sections bent to fit upon a round pipe and having apertured ears for the reception of adjusting screws 19 whereby the rear member can be moved away from the forward member to fit upon pipes of unusually large diameter. By virtue of this arrangement my improved valve mechanism can be quickly secured upon the overflow pipes of flush tanks now in use, regardless of the diameter of such overflow pipes.

The member 18 is secured upon the overflow pipe at a distance sufficiently above the valve seat to allow the valve 13 to rest snugly in the seat, while the bent end portion 14$^a$ of the valve stem is spaced slightly above the uppermost arm of the bearing bracket 15. This bent portion 14$^a$ is preferably formed substantially as shown in Figure 3, with one section bent at right angles to the vertical portion of the stem and having a second bent portion at right angles to the first bent portion but in substantially the same horizontal plane. The purpose of the first bent portion mentioned is to provide a member to be engaged by the slotted link 20 arranged between the valve stem and the shock absorbing member 21, and the second bent portion of the valve stem is for the prevention of accidental dislocation of the link 20 should it be rocked because of out-of-line position of the operating lever 10, wear of the bearings of the shaft 8, or any like reason. Figure 8 shows the extremes of lateral movement permitted the link 20 without the possibility of dislocation. It is not believed possible for any ordinary tank mechanism to impart ranges of movement greater than those shown and still remain in actual use.

The link 20 is formed with a horizontal shoulder 20$^a$ at its lower portion in which is drilled an opening slightly greater in diameter than the diameter of the valve stem 14. The shoulder 20$^a$ engages the bent portion 14$^a$ of the valve stem when it is desired to operate the valve mechanism, and further movement lifts the valve stem and valve. When the lever is released, however, the link is free to move downwardly while the stem is still in raised position, the pouring of the water into the valve seat 11 holding the semi-buoyant ball valve 13 in raised position until the tank has been emptied. The shoulder 20$^a$ in its lowermost position rests upon a gasket 22 of rubber, fiber, or other sound-deadening material surrounding the valve stem and normally resting upon the uppermost arm of the bracket 15. When the link 20 and parts connected thereto fall (when the handle is released), the shoulder 20$^a$ impinges upon the rubber gasket without noise. A similar gasket 23 is also preferably arranged on the lower face of the lowermost arm of the bracket 15 and is contacted by the lock nuts 24 which are screwed upon the valve stem in position to safeguard the threading of the stem into the bushing of the ball valve 13 and to relieve the valve and bushing of the shock of impact against the bracket 15 when the valve is lifted.

The upper portion of the link 20 is preferably formed with a neck portion 25, substantially as shown in Figure 5, for securing the shock absorbing member 21 thereon. The shock absorbing member is herein shown as a coil spring and the neck portion 25 is provided with ears 26 arranged to be threaded between the coils. This threading of the coils upon the neck portion is utilized for purposes of adjustment, the spring being turned upon the neck 25 until it has overlapped a sufficient portion thereof to make the length of the valve operating mechanism sufficient to just fill the space between the valve seat 11 and the operating lever 10. If the lever falls lower than is customary, a portion of the spring must be cut off and the remainder threaded until the desired adjustment of height is effected. The uppermost portion of the spring is formed as a bail and extends through an aperture in the free end of the lever 10.

The operation of my valve mechanism is believed to be apparent. The parts are normally assembled into the position shown in full lines in Figure 1. To operate, the handle 9 is swung into the position shown in dotted lines, and the swinging movement is imparted to the lever 10, raising the free end thereof to the position shown in dotted lines. The raising of the lever tends to stretch the shock absorbing member 21 and the lifting movement is imparted therethrough to the link 20, which moves slightly to engage the bent portion 14$^a$ of the valve stem, and then upon further movement lifts the valve stem and valve. The upward movement of the valve continues until the lock nut 24 engages the sound-deadening washer 23 and further movement of the lever is then taken up by the shock absorbing member alone, the spring stretching without further moving the link or stem upwardly. Upon releasing the handle 9 the lever 10 is pulled downwardly by the spring 21 and its own gravity and the link 20 falls with it until the shoulder 20$^a$ engages the sound-deadening washer 22. The water flowing through the valve seat 11 into the outlet pipe 6 exerts a lifting action upon the semi-buoyant hollow ball valve 13, which maintains the valve and stem in lifted position until the tank is entirely emptied, whereupon the valve, relieved of its buoyancy, again falls into the valve seat. This reseating is assured bcause the valve in falling is guided by the stem 14 passing through the bearings in the bracket arms 15, which have previously been accurately aligned with the center of the valve seat by adjusting the connecting means 17.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention, I claim:

1. In a flush tank valve mechanism, a ball valve, a stem therefor having a bent upper portion, an operating lever, a slotted link fitting over the stem of the valve and receiving the bent upper stem portion in its slot, and a shock absorbing member connected to the link and lever, one of said connections being adjustable to vary the distance between the link and lever.

2. In a flush tank valve mechanism, a ball valve, a stem secured at its lower extremity to the valve and having a shoulder adjacent its upper extremity, a slotted link loosely fitting over the stem between the valve and shoulder and receiving the shoulder between the walls of the slot, a spring connected to the upper portion of the link, and an operating lever connected with the spring.

3. In a flush tank valve mechanism, a ball valve, a stem secured thereto, a bracket through which the upper portion of the stem is guided, a link loosely mounted over the guide stem above the bracket, a coil spring connected with the link, said link being formed with a neck portion adapted to thread into the coils of said coil spring to effect adjustments in length of the spring, and an operating lever connected with the spring.

CLARENCE H. HAPGOOD.

Witnesses:
REX FRYE,
C. O. MARSHALL.